United States Patent
Chan et al.

(10) Patent No.: US 8,893,527 B1
(45) Date of Patent: Nov. 25, 2014

(54) SINGLE SURFACE ANNEALING OF GLASS DISKS

(75) Inventors: Richie Y. Chan, Air Itam (MY); Magenthiran Verapatran, Sungai Petani (MY); Mohamad F. Azmi, Serdang (MY); Beehuah Ong, Butterworth (MY)

(73) Assignee: WD Media, LLC, San Jose, CA (US)

( * ) Notice: Subject to any disclaimer, the term of this patent is extended or adjusted under 35 U.S.C. 154(b) by 401 days.

(21) Appl. No.: 13/187,936

(22) Filed: Jul. 21, 2011

(51) Int. Cl.
*C03B 25/02* (2006.01)

(52) U.S. Cl.
CPC .................................... *C03B 25/02* (2013.01)
USPC .................... 65/117; 65/69; 65/95; 65/104

(58) Field of Classification Search
CPC ........ C03B 25/00; C03B 25/02; C03B 25/04; C03B 25/06; C03B 25/10; C03B 25/12
USPC .................... 65/69, 95, 104, 117, 118, 119
See application file for complete search history.

(56) References Cited

U.S. PATENT DOCUMENTS

| | | | |
|---|---|---|---|
| 3,697,242 A | 10/1972 | Shonebarger | |
| 5,643,649 A * | 7/1997 | Hagan et al. | 428/64.1 |
| 5,654,057 A | 8/1997 | Kitayama et al. | |
| 5,681,609 A | 10/1997 | Kitayama et al. | |
| 5,733,622 A | 3/1998 | Starcke et al. | |
| 5,858,047 A * | 1/1999 | Frank et al. | 65/104 |
| 5,910,371 A | 6/1999 | Francel et al. | |
| 5,916,656 A | 6/1999 | Kitayama et al. | |
| 6,363,599 B1 | 4/2002 | Bajorek | |
| 6,395,634 B1 | 5/2002 | Miyamoto | |
| 6,588,232 B1 * | 7/2003 | Suzuki et al. | 65/32.3 |
| 6,638,623 B2 | 10/2003 | Jensen et al. | |
| 6,801,397 B2 | 10/2004 | Yamamoto et al. | |
| 6,908,870 B2 | 6/2005 | Kawai | |
| 7,001,669 B2 | 2/2006 | Lu et al. | |
| 7,040,953 B2 | 5/2006 | Matsuno et al. | |
| 7,703,303 B2 | 4/2010 | Isono et al. | |
| 8,316,668 B1 * | 11/2012 | Chan et al. | 65/114 |
| 2003/0077982 A1 | 4/2003 | Takizawa | |
| 2003/0096078 A1 * | 5/2003 | Horisaka et al. | 428/66.6 |
| 2003/0182966 A1 * | 10/2003 | Fotheringham et al. | 65/33.2 |
| 2004/0107731 A1 * | 6/2004 | Doehring et al. | 65/81 |
| 2004/0194508 A1 * | 10/2004 | Nishimoto et al. | 65/33.1 |
| 2005/0096210 A1 | 5/2005 | Kawai | |
| 2005/0223744 A1 * | 10/2005 | Horisaka et al. | 65/61 |
| 2007/0039353 A1 | 2/2007 | Kamiya | |
| 2008/0016684 A1 * | 1/2008 | Olechnowicz et al. | 29/748 |
| 2008/0066676 A1 * | 3/2008 | Mariner et al. | 118/715 |
| 2008/0066683 A1 * | 3/2008 | Fujimura et al. | 118/724 |
| 2009/0104369 A1 * | 4/2009 | Rajala et al. | 427/475 |
| 2011/0104427 A1 * | 5/2011 | Suzuki | 428/64.2 |

* cited by examiner

*Primary Examiner* — Joseph S Del Sole
*Assistant Examiner* — Russell Kemmerle, III

(57) ABSTRACT

A method for annealing a glass disk is disclosed. The glass disk is placed on a base, whereby the bottom surface of the glass disk makes a contact with the base, and the top surface of the glass disk is exposed to air. The glass disk is heated with thermal energy supplied to the glass disk, the thermal energy comprising first thermal energy supplied from the air through the top surface and second thermal energy supplied from the base through the bottom surface.

16 Claims, 7 Drawing Sheets

SINGLE SURFACE ANNEALING OF GLASS DISKS

FIELD OF THE INVENTION

The present invention generally relates to glass annealing and, in particular, relates to single surface annealing of glass disks.

BACKGROUND

Glass annealing is a process of slowly heating up and slowly cooling glass to relieve internal stresses after the glass is formed. Annealing of glass through slow cooling provides a homogeneous structure by reducing internal stresses to give isotropic properties. Glass which has not been annealed is prone to crack or shatter when subjected to a relatively small temperature change or mechanical shock. Annealing glass is critical to its durability. If glass is not annealed, it will retain many of the thermal stresses caused by grinding, polishing and will possess a low overall strength.

During a glass annealing process, the glass is heated until the temperature reaches a stress-relief point, that is, the annealing temperature (also called annealing point) at which the glass is still too hard to deform, but is soft enough for the internal stresses to relax. The glass is then allowed to heat-soak until its temperature is even throughout.

In the context of magnetic recording media manufacturing, a glass substrate in the form of a disk needs to be annealed before depositing various magnetic layers thereon. A traditional approach to performing such a glass annealing process on glass disks is by a "disk stacking annealing" process in which a stack 120 of glass disks 122, 124, 126, 128 are provided on a thick glass base 110 as depicted in FIG. 1 before heat is applied to the stack. In this arrangement, both top and bottom surfaces of the glass disks 122, 124, 126, 128 are in contact with and receive heat from other glass disks in the stack 120 during the annealing process.

It has been found that such disk stacking annealing process results in defects such as diffusion, curvy scratches, ID size variations and low disk strength.

BRIEF SUMMARY OF THE INVENTION

The present disclosure addresses this and other problems by providing various systems and methods for single surface annealing of glass disks.

In certain aspects, a method for annealing a glass disk is provided. The method can comprise placing the glass disk on a base, whereby the bottom surface of the glass disk makes a contact with the base, and the top surface of the glass disk is exposed to air. The method can further comprise heating the glass disk with thermal energy supplied to the glass disk, the thermal energy comprising first thermal energy supplied from the base through the bottom surface, and second thermal energy supplied from the air through the top surface.

In certain aspects, an apparatus for annealing glass disks is provided. The apparatus can comprise a base configured to receive a glass disk thereon, whereby the bottom surface of the glass disk makes a contact with the base, and the top surface of the glass disk is exposed to air. The apparatus can further comprise a heat source configured to heat the air and the base, thereby supplying thermal energy to the glass disk.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
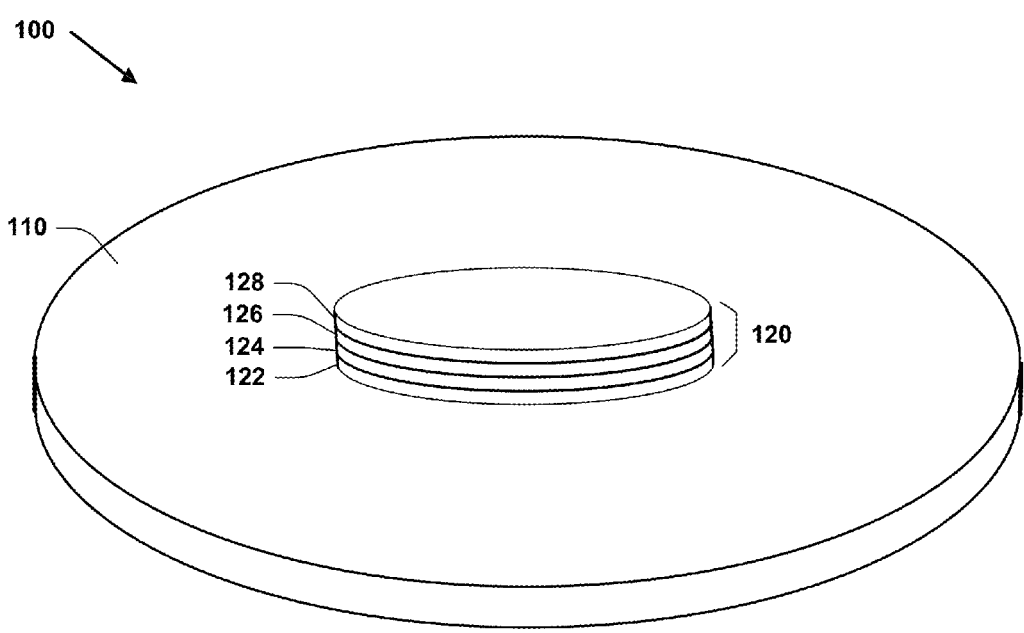
FIG. 1 is a diagram illustrating a prior art disk stacking annealing process.
Figure 2:
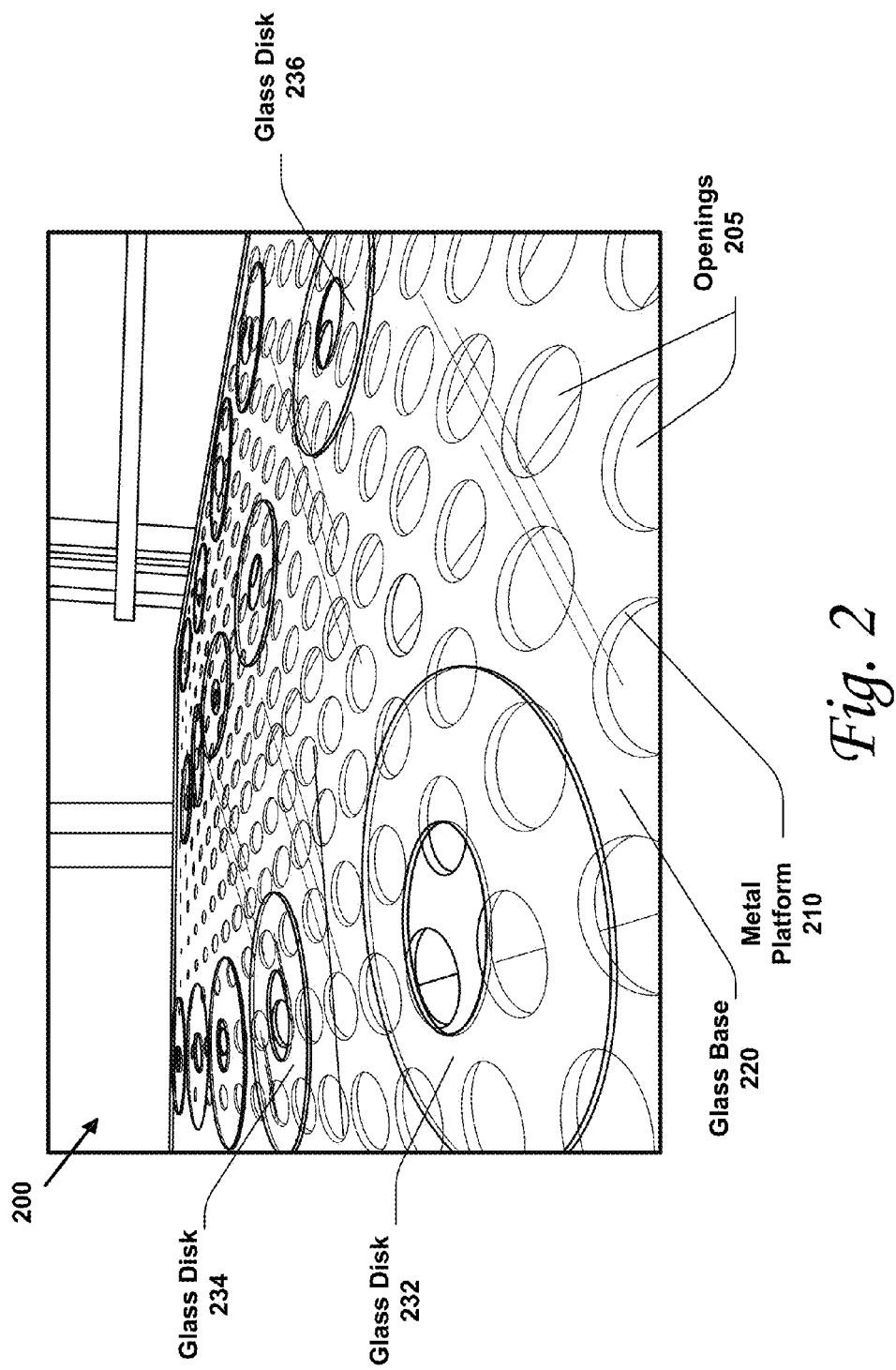
FIG. 2 is a diagram depicting an interior view of an oven chamber designed for an exemplary single surface annealing process according to certain aspects of the subject disclosure.

FIG. 2 is a diagram depicting an interior view of an oven chamber 200 with an arrangement designed for an exemplary single surface annealing process according to certain aspects of the subject disclosure. In the illustrated example of FIG. 2, a base 220 is provided on a metal platform 210. The metal platform 210 includes a plurality of openings 205 to facilitate air circulation inside the oven chamber 200. In certain embodiments, the base 220 is a sheet of glass comprising e.g., soda lime. In some embodiments, the sheet of glass 220 has a thickness between about 10 and 20 mm. In some embodiments, the oven chamber 200 includes a computer-controlled heat source (e.g., a heating element) that allows for a precise control of temperature inside the oven chamber 200. The oven chamber 200 can also include a fan for circulating hot air inside the chamber.

Also shown in FIG. 2 are glass disks 232, 234, 234 that are placed on the glass base 220. In the illustrated arrangement, the bottom surface of the glass disk (e.g., 232) is in contact with the top surface of the glass base 220, while the top surface of the glass disk is exposed to air inside the oven chamber 200. In the illustrated embodiment, the glass disk (e.g., 232) is an annular ring having an ID and an OD. In certain embodiments, the glass disk comprises lithium aluminum silica. In some embodiments, the glass disk has a thickness between about 0.80 and 0.82 mm.

Figure 3:
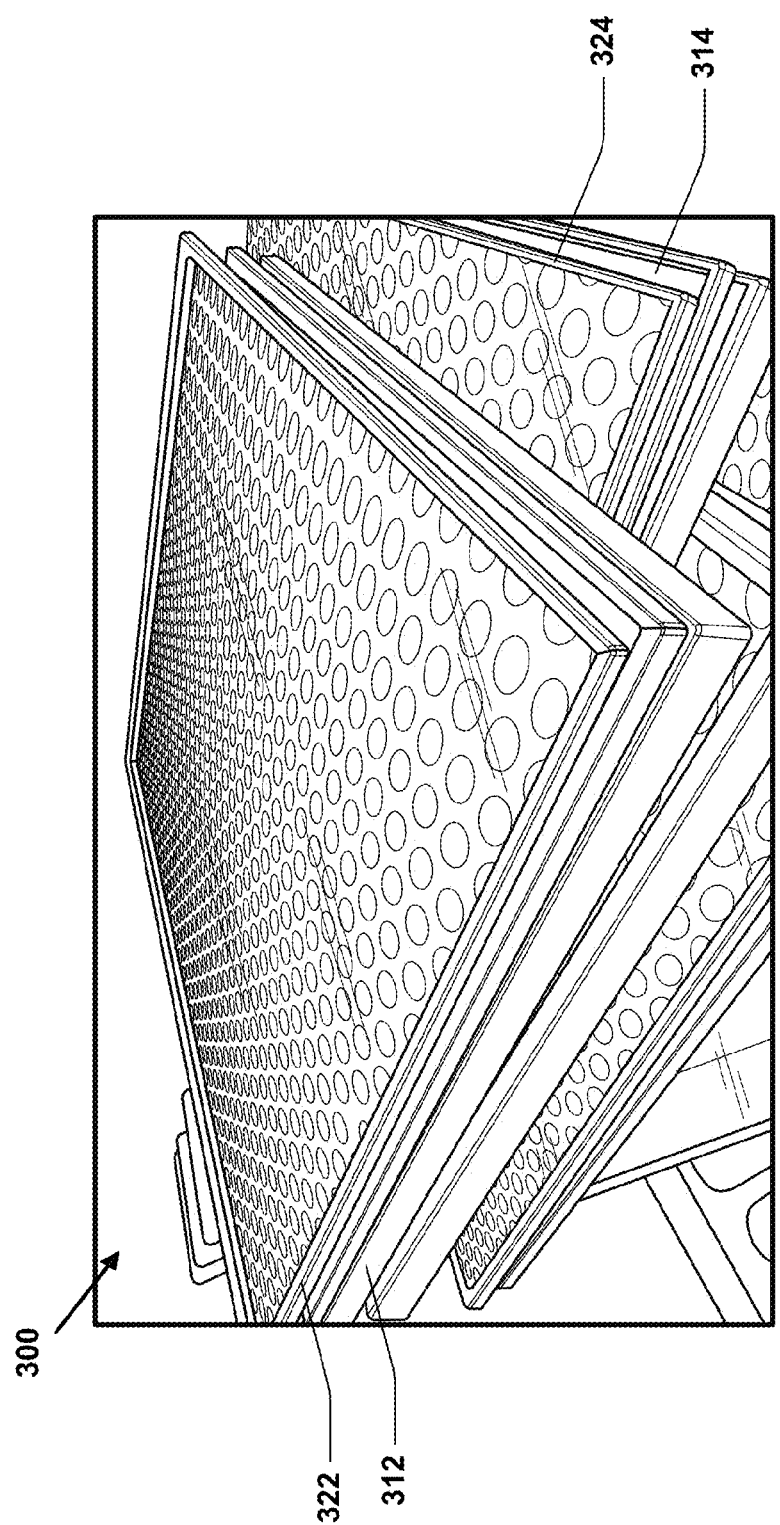
FIG. 3 is a diagram depicting another interior view of an oven chamber with an arrangement designed for an exemplary single surface annealing process according to certain aspects of the subject disclosure.

FIG. 3 is a diagram depicting another interior view of an oven chamber 300 with an arrangement designed for an exemplary single surface annealing process according to certain aspects of the subject disclosure. In the illustrated example of FIG. 3, a plurality of metal platforms 312, 314 and respective glass bases 322, 324 placed thereon are provided inside the oven chamber 300. One or more glass disks to be annealed (not shown) can be placed on each of the glass bases 322, 324.

Figure 4:
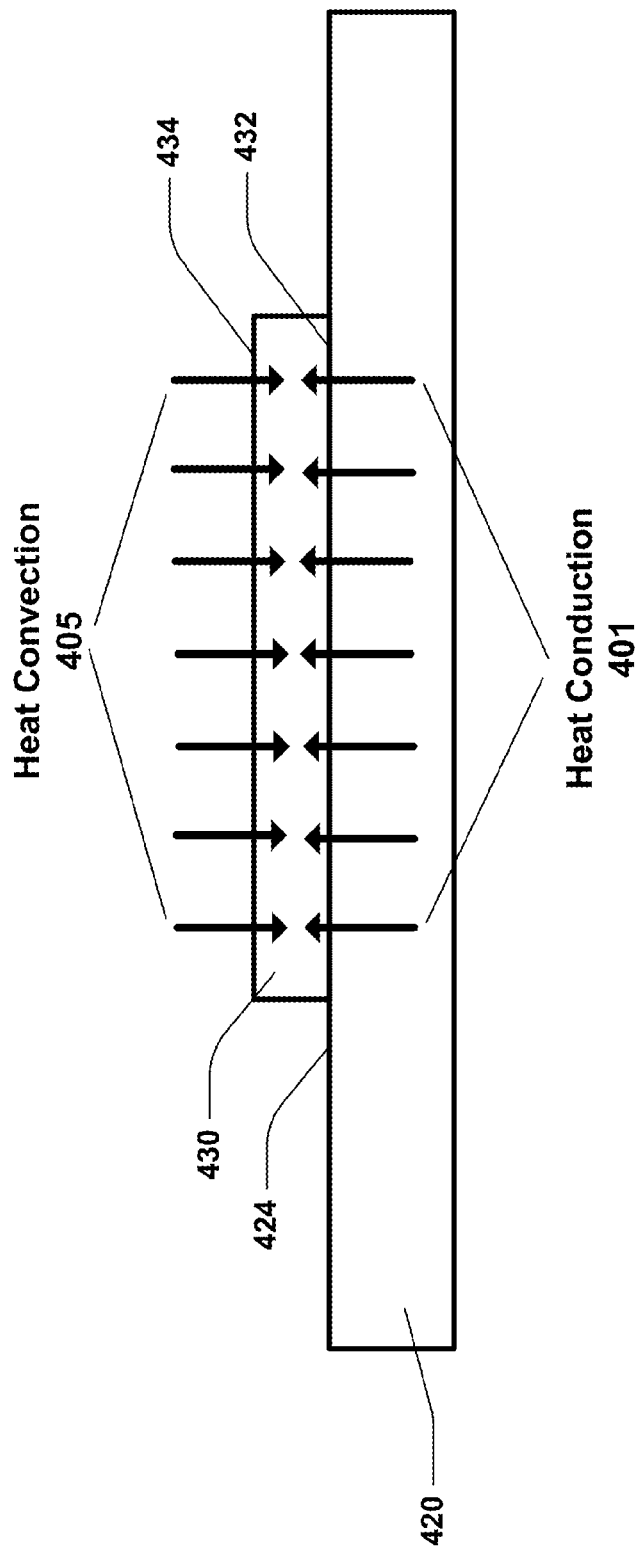
FIG. 4 is a diagram illustrating heat conduction and heat convection mechanisms for transferring thermal energy to a glass disk during a single surface annealing process according to certain aspects of the subject disclosure.

FIG. 4 is a diagram illustrating heat conduction and heat convection mechanisms for transferring thermal energy to a glass disk 430 placed on a glass base 420 during a single surface annealing process according to certain aspects of the subject disclosure. In the heat conduction mechanism, illustrated by the arrows 401, thermal energy flows from the glass base 420 to the glass disk 430 via the physical contact made between the top surface 424 of the glass base 420 and the bottom surface 432 of the glass disk 430. In the heat convection mechanism, illustrated by the arrows 405, thermal energy flows from the hot air inside the oven chamber to the glass disk 430 via the top surface 434 of the glass disk 430.

Figure 5:
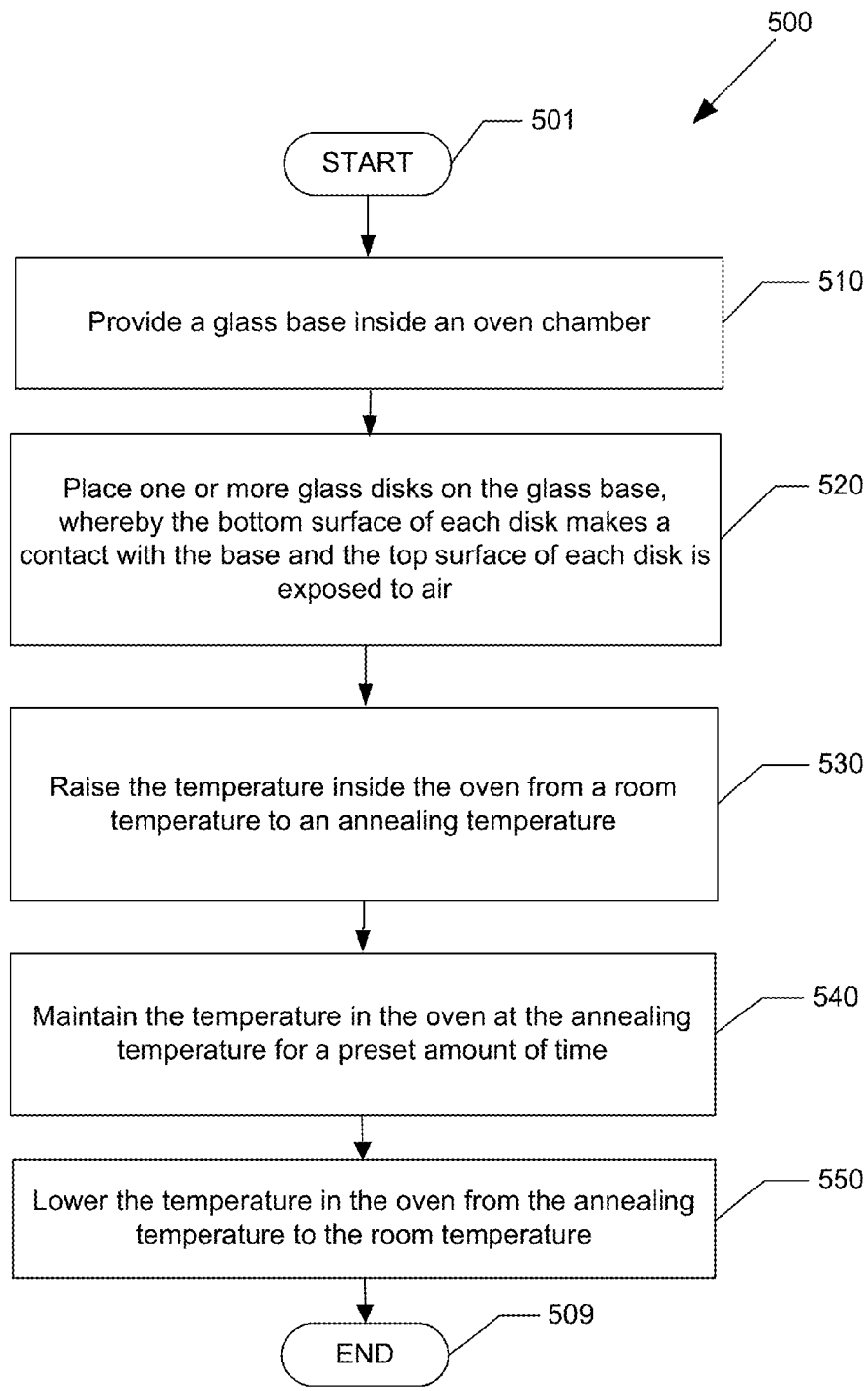
FIG. 5 is a flowchart illustrating an exemplary single surface annealing process according to certain aspects of the subject disclosure.

FIG. 5 is a flowchart illustrating an exemplary single surface annealing process 500 according to certain aspects of the subject disclosure. For the sake of clarity only without the intention to limit the scope of the subject disclosure in any way, the annealing process 500 will be described below with references to FIGS. 2 and 4 described above. The annealing process 500 begins at start state 501 and proceeds to operation 510 in which the glass base 220 is provided inside the oven chamber 200. In the illustrated embodiment of FIG. 2, the glass base 220 is placed on top of the metal platform 210 having the air openings 205. The glass base 220 can comprise soda lime and can have a thickness between about 10 and 20 mm. In some alternative embodiments, a metal base can be used instead of the glass base 210.

The annealing process 500 proceeds to operation 520 in which the glass disks 232, 234, 236 to be annealed are place on the glass base 220. With reference to FIG. 4, the bottom surface 432 of the glass disk 430 makes a physical contact with the top surface 424 of the glass base 420; and the top surface 434 of the glass disk 430 is exposed to air inside the oven chamber.

The annealing process 500 proceeds to "ramp-up" operation 530 in which the temperature inside the oven chamber is raised from a room temperature to an annealing temperature for the glass material comprising the glass disk. The annealing temperature for a glass material corresponds to a temperature at which the glass material is still too hard to deform, but is soft enough for the internal stresses to relax. In case of a lithium aluminum silica (LAS) glass disk, the annealing temperature is at or below 580 degrees Celsius. With reference to FIG. 4, during the ramp-up operation 530, the glass disk 430 receives first thermal energy (indicated by the arrows 405) supplied from the hot air through the top surface 434, and second thermal energy (indicated by the arrows 401) supplied from the glass base 420 through the bottom surface 432. The ramp-up operation 530 continues until the temperature inside the oven chamber reaches the annealing temperature. In certain embodiments, the temperature is raised from the room temperature to the annealing temperature at a rate between about 4 and 5 degrees Celsius per minute in a duration between about 120 to 135 minutes.

The annealing process 500 proceeds to "heat-soaking" operation 540 in which the temperature inside the oven chamber is maintained at the annealing temperature for a preset amount of "soaking" time. During the soaking time, the temperature inside the glass disk 430 becomes uniform throughout the glass material and internal stresses in the glass material are relaxed. In certain embodiments, the soaking time lasts between about 30 and 40 minutes.

The annealing process 500 proceeds to "cooling" operation 550 in which the temperature inside the oven chamber is lowered from the annealing temperature to the room temperature. In certain embodiments, the temperature is lowered at a rate between about 120 and 165 minutes. The annealing process 500 ends at state 509.

Figure 6A:
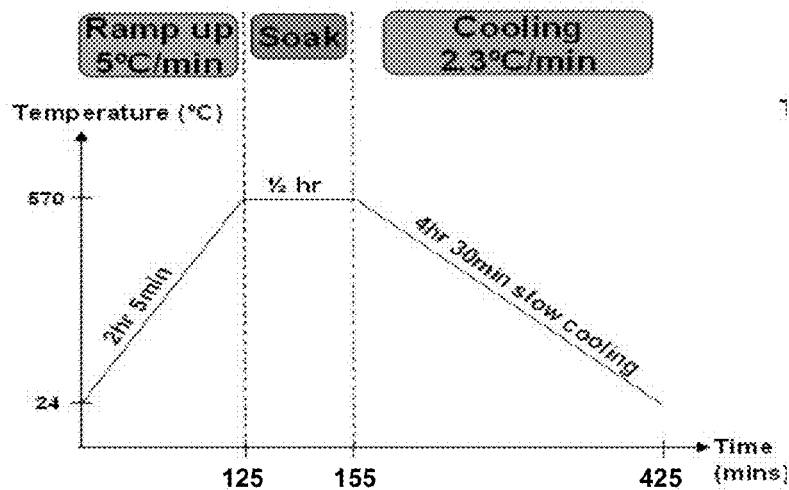
FIG. 6A and FIG. 6B are diagrams illustrating respective controlled temperature profiles associated with the prior art disk stacking annealing process and the single surface annealing process of the subject disclosure.
Figure 6B:
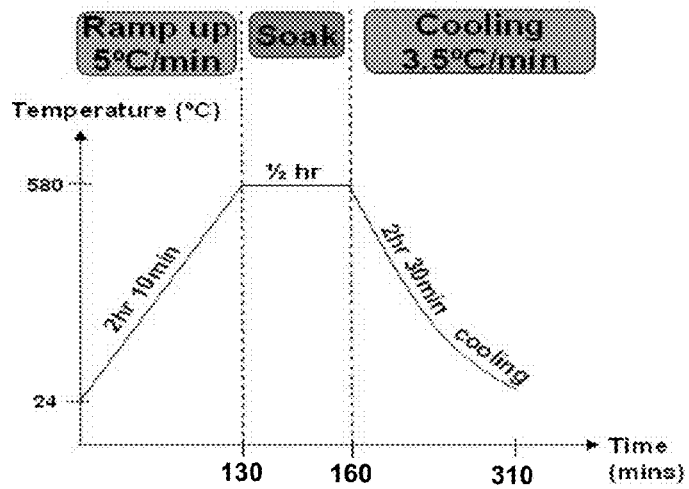

FIG. 6A and FIG. 6B are diagrams illustrating respective controlled temperature profiles associated with the prior art disk stacking annealing process (labeled as "Stacking Annealing") and the single surface annealing process (labeled as "Singular Annealing") of the subject disclosure. As can be seen from FIG. 6A, in the prior art disk stacking annealing process, the temperature is raised to 570 degrees Celsius, which is below the annealing temperature for the LAS glass disk, and it takes a relatively long time of about 270 minutes or above to cool the temperature of the stacked glass disks down to the room temperature. As can be seen from FIG. 6B, in the single surface annealing process, the temperature is raised to the annealing temperature of 580 degrees Celsius for the LAS glass disk and the cooling time is substantially reduced to about 160 minutes or less.

The single surface annealing process of the subject disclosure gives the glass disk a higher bending resistance and higher overall strength. It also creates a compressive stress on the disk surface. While going through strength test (tensile stress), compressive stress counterbalances any additional tensile stress incurred.

The single surface annealing process is found to substantially reduce defects such as diffusion, curvy scratches, ID size variations and low disk strength associated with the prior art disk stacking annealing process discussed above. For example, with less disk-to-disk direct surface contact, there is no scratch that forms on the glass disk surface. By placing the glass disk individually on a thick glass base (e.g., 12 mm-thick), the heat is able to transfer from the glass base to the glass disk's bottom surface (heat conduction) while leaving the top surface exposed to the hot air in the oven chamber, thereby allowing for heat convection.

Figure 7:
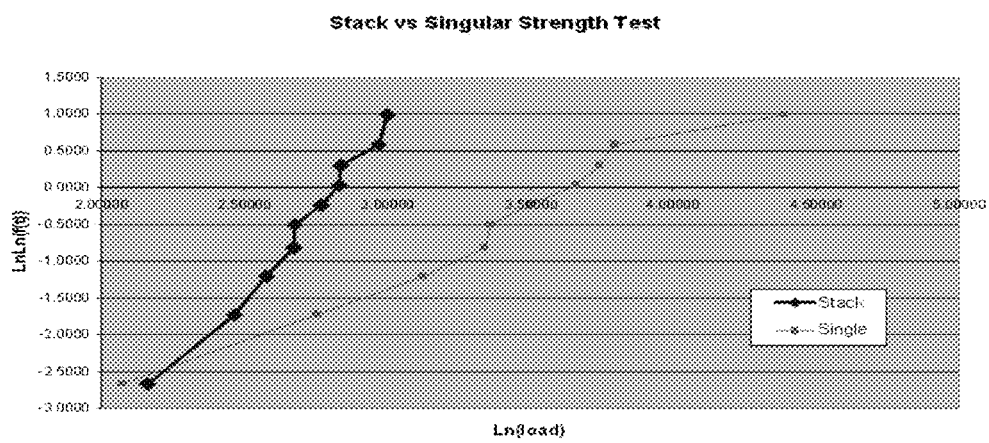
FIG. 7 is a diagram that provides a comparison of the strength of a glass disk annealed using the prior art disk stacking annealing process and the strength of a glass disk annealed using the single surface annealing process of the subject disclosure.

Glass disks manufactured using the single surface annealing process of the present disclosure are found to have higher bending resistance than glass disks manufactured using the prior art stacking annealing process or chemical strengthening without heat treatment. Test data shows that the single surface annealing process increases the disk strength from average of 20 kg to average 50 kg with a maximum at 80 kg. FIG. 7 is a diagram that provides a comparison of the strength of a glass disk annealed using the prior art disk stacking annealing process and the strength of a glass disk annealed using the single surface annealing process of the subject disclosure. The comparison indicates a significant improvement in the disk strength resulting from the use of the single surface annealing process.

Furthermore, ID size variations are reduced from about 6.5 microns to about 4 microns. No diffusion and curvy scratches were observed in the disk surfaces. In addition, the single surface annealing process of the subject disclosure eliminates a coating process. For example, while the prior art stacking annealing process required coating with Ludox and Alumina, the single surface annealing process does not require the Alumina coating.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A method for annealing a glass disk, the method comprising:
    placing the glass disk on a base comprising a sheet of glass having a plurality of openings that facilitate air circulation, whereby the bottom surface of the glass disk makes a contact with the base, and the top surface of the glass disk is exposed to air; and
    heating the glass disk with thermal energy supplied to the glass disk, the thermal energy comprising first thermal energy supplied from the air through the top surface and second thermal energy supplied from the base through the bottom surface.

2. The method of claim 1, wherein the glass disk comprises Lithium Aluminum Silica (LAS).

3. The method of claim 1, wherein the glass disk has a thickness between about 0.8 and 0.82 mm.

4. The method of claim 1, wherein a sheet of glass comprises soda lime.

5. The method of claim 4, wherein the sheet of glass has a thickness between about 10 and 20 mm.

6. The method of claim 1, wherein the glass disk is heated until its temperature reaches an annealing temperature.

7. The method of claim 6, wherein the annealing temperature is at or below 580 degrees Celsius.

8. The method of claim 6, wherein the heating comprises raising the temperature of the glass disk from a room temperature to the annealing temperature.

9. The method of claim 8, wherein the temperature is raised at a rate between about 4 and 5 degrees Celsius per minute.

10. The method of claim 8, wherein the temperature raising lasts between about 120 and 135 minutes.

11. The method of claim 8 further comprising, after raising the temperature, maintaining the temperature substantially at the annealing temperature.

12. The method of claim 11, wherein the temperature maintaining lasts between about 30 and 40 minutes.

13. The method of claim 1 further comprising lowering the temperature of the glass disk after the temperature maintaining.

14. The method of claim 13, wherein during the temperature lowering, the temperature of the glass disk is lowered from the annealing temperature to the room temperature.

15. The method of claim 14, wherein the temperature is lowered at a rate between about 3 and 3.5 degrees Celsius per minute.

16. The method of claim 13, wherein the temperature lowering lasts between about 120 and 165 minutes.

\* \* \* \* \*